Patented Aug. 12, 1947

2,425,677

UNITED STATES PATENT OFFICE 2,425,677

FUNGICIDAL COMPOSITIONS

Wilbie S. Hinegardner, Niagara Falls, and Norman D. Scott, Sanborn, N. Y., assignors to E. I. du Pont de Nemours & Company, Wilmington, Del., a corporation of Delaware No Drawing. Application May 2, 1945, Serial No. 591,635

6 Claims. (Cl. 167—26)

This invention relates to volatile fungicides and more particularly to fungicides in which formaldehyde vapor is an active fungicidal agent.

Formaldehyde vapor has been used extensively in the past to fumigate or disinfect rooms and other enclosed areas in an attempt to kill bacteria and fungi. Various devices such as formaldehyde candles, which volatilize a formaldehyde solution upon burning, and a chemical reaction between part of the formaldehyde solution, and an oxidizing agent to furnish heat to volatilize part of the remainder have been tried to get sufficient vapor into an enclosure to be of value as a disinfectant. Formaldehyde is also obtained by allowing paraformaldehyde, a linear polymer of formaldehyde sold commercially under that name, to evaporate.

Formaldehyde is used for disinfecting and fumigating because it kills many species of bacteria and fungi, small amounts are not particularly harmful, and its disagreeable odor warns anyone to keep out of the area.

However, formaldehyde vapor is not effective against many species of fungi, of which the common molds are examples, and relatively high concentrations are required together with careful control of humidity and temperature if it is to kill fungi in substantial numbers. Furthermore, many species of fungi are not killed by any practically attainable concentration of formaldehyde vapor. Paraformaldehyde does not give off sufficient vapor when exposed at ordinary temperatures to be of much value as a fungicide.

This invention has as an object a volatile fungicide that will kill essentially all fungi in an enclosed area and protect valuable materials from damage or destruction by fungus growth. A further object is to prepare an effective fungicide from paraformaldehyde that will effectively prevent the growth of all fungi when allowed to evaporate in an enclosed area. A further object is to devise a fungicide based on paraformaldehyde that does not require special means to insure sufficient fungicidal vapor in the enclosed space. Another object is an improved method for destroying or preventing the growth of fungi. Still other objects will be apparent from the following description.

These objects are accomplished by the discovery that sym.-trichloroaniline, when mixed with paraformaldehyde and the mixture is allowed to evaporate in an enclosed space, kill essentially all species of fungi. The effect is much more than the additive fungicidal properties of the two constituents as shown in the examples presented later. This additional effect, known as synergism, is unexpectedly large in the case of paraformaldehyde. No other material than paraformaldehyde, of a large number examined, showed such a high degree of synergism when paired with the trichloroaniline. The maximum synergistic effect is obtained when paraformaldehyde makes up 50–90 per cent of the mixture. Still larger paraform concentrations may be used if desired; that is, the trichloroaniline content may be less than 10 per cent and as low as 5 per cent. However, at such low concentrations of trichloroaniline the synergistic action is less marked. When paraformaldehyde becomes the minor constituent of the mixture of two materials, that is 25 per cent or less, such mixtures are usually no longer completely fungicidal even though they are still more highly fungicidal than paraformaldehyde alone. The preferred concentration is 75–90 per cent paraformaldehyde.

Sym.-trichloroaniline, also termed 2,4,6-trichloroaniline, is a well-known compound having the formula $C_6H_2Cl_3.NH_2$. It is a solid compound, melting at 77.5° C. and boiling at 262° C.

We have discovered that sym.-trichloroaniline, when mixed in the proportion of 5–50 per cent with paraformaldehyde exhibits the above-described synergistic effect and forms a completely fungicidal vapor when allowed to vaporize into an enclosed space.

Example 1

Ninety grams of commercial paraformaldehyde powder was mixed with ten grams of powdered crystalline sym.-trichloroaniline and the mixture pelleted to approximately 0.1 g. each. The paraformaldehyde and trichloroaniline were each pelleted separately. The three lots of pellets were each tested individually in a chamber prepared by putting similar halves of 4″ Petri dishes together on the edges. Before fitting together, one of the halves had a small glass cup cemented in the center and the other a coating of standard nutrient agar as a medium for growing fungi. The nutrient agar was inoculated separately with six resistant species of fungi equally spaced in a circular pattern, namely Monilia sp., Aspergillus niger, Penicillium sp., Spicaria sp., Rhizopus sp. and Gliocladium fimbriatum. One pellet of the material to be tested as a fungicide was placed in the cup and the half that had been inoculated inverted over the first part and their edges sealed together with adhesive tape. The Petri dishes were incubated at 30° C. for five days. The amount of growth for each species was recorded daily for the five days. Any fungi not growing during this time was transferred to fresh nutrient agar away from the fungicide to determine whether that species had been killed or merely prevented from growing; that is, to determine whether the action was fungicidal or merely fungistatic to that species of fungi.

In a number of tests one half of the spicies grew in the dish containing paraformaldehyde pellets. Five of the six species grew in the dish with the trichloroaniline. The dish with the mixed paraformaldehyde-trichloroaniline pellet had no growth and none of the species grew on transfer to a new medium.

The above procedure was repeated with a mixture containing 75 per cent by weight of paraformaldehyde to 25 per cent of the trichloroaniline. This mixture was also completely fungicidal, killing all six species of fungi tested.

*Example 2*

The three types of pellets described in Example 1 were further tested in similar chambers made from six-inch Petri dishes, but with ten additional resistant tropical fungi; namely, *Monilia crassa*, Penicillium sp. (2 specimens), Aspergillus sp., *Aspergillus flavus*, Stachybotrys sp., *Sporotrichum roseum*, Alternaria sp., *Aspergillus chevalieri*, and Mucor sp. When paraformaldehyde was used alone only two of the fungi were killed. Sym.-trichloroaniline alone killed only 50 per cent of these fungi. However, a mixture of the two compounds containing 5–50 per cent of trichloroaniline killed all ten fungi in every test. This test was also repeated with the mixture of paraformaldehyde and trichloroaniline at 21–25° C. (room temperature). Again no species grew after inoculation nor upon transfer.

*Example 3*

Example 1 was repeated on a mixture of paraformaldehyde 25 per cent+sym.-trichloroaniline 75 per cent. This mixture allowed only two species of fungi to grow.

*Example 4*

Example 3 was repeated, except that the paraformaldehyde concentration was decreased to 10 per cent. The mixture allowed two species to grow.

The fungicidal compositions of matter herein described are solids that can be used as a powder or for convenience can be compressed into pellets. A small amount of lubricant such as magnesium stearate can be added to improve pelleting. Except for the lubricant, these pellets are almost completely volatile and leave essentially no residue for disposal.

If desired, other materials may be incorporated in the mixtures, such as finely divided solid inert diluents, or other fungicidal materials may be added. For some purposes, insecticides or known bactericides may also be added. The mixtures can be incorporated in suitable non-aqueous liquids for spraying purposes, for example in a liquid hydrocarbon.

For some purposes, the trichloroaniline can be used alone, i. e. in the absence of paraformaldehyde, in combination with various diluents or other conventional ingredients as described above, to prepare fungicidal compositions.

These pellets or powdered mixtures offer a most convenient means for obtaining a fungicidal atmosphere in an enclosed space, but this method of making use of this synergistic effect is intended in no way to limit the scope of this invention. The two constituents can be introduced separately into the enclosed space without previous mixing. Thus, formaldehyde vapor can be added by any means and 10–50 per cent of the second constituent can be introduced before or after the formaldehyde. If this mixed vapor is kept in the enclosed space by any means, it will still be fungicidal.

These mixtures are fungicidal within the range of temperature that fungi commonly grow and at any higher temperature desired.

The fungicidal compositions of matter described under this invention may be used to protect materials from fungi (molding) in any enclosed area where fungi grow. Materials stored in damp basements especially in hot weather nearly always mold. Leather goods, which are very apt to mold, can be preserved by these mixtures. Things packed for tropical shipment can be kept free of fungi. Molds in garbage pails can be prevented by this means. These volatile fungicides do not need to be placed in the materials to be protected, since the vapor alone will protect. In this way they are superior to contact fungicides. They are particularly effective in warm, damp places, since water vapor does not react with them to destroy their fungicidal properties, and fungi are prone to grow rapidly under such conditions.

The fungicidal mixtures claimed herein are essentially completely fungicidal under conditions usually encountered in enclosed spaces and are easy to apply. Elaborate or expensive equipment is not required. The fungicidal mixtures claimed herein are sufficiently harmless for general use.

We claim:

1. A fungicidal composition comprising a mixture of paraformaldehyde and sym.-trichloroaniline.

2. A fungicidal composition comprising a mixture of paraformaldehyde and sym.-trichloroaniline containing at least 50 per cent by weight of paraformaldehyde.

3. A fungicidal composition comprising a mixture of paraformaldehyde and sym.-trichloroaniline containing from 50 per cent to about 85 per cent by weight of paraformaldehyde.

4. The method for preventing growth of fungi in an enclosed space which comprises simultaneously introducing into said space vapors of formaldehyde and sym.-tricholoroaniline.

5. The method for preventing growth of fungi in an enclosed space which comprises simultaneously introducing into said space vapors of formaldehyde and sym.-trichloroaniline in such proportion that the formaldehyde vapor constitutes at least 50 per cent by weight of the combined vapors.

6. The method for preventing growth of fungi in an enclosed space which comprises simultaneously introducing into said space vapors of formaldehyde and sym.-trichloroaniline in such proportion that the formaldehyde vapor constitutes from 50 per cent to about 85 per cent by weight of the combined vapors.

WILBIE S. HINEGARDNER.
NORMAN D. SCOTT.

REFERENCES CITED

The following references are of record in the file of this patent:

Siegler et al., U. S. D. A. Circular No. 523, May 1939, page 4.

Guy, University of Delaware Agri. Expt. Station Bulletin No. 206, February 1937, page 58.